US012009198B1

(12) United States Patent
Kuno et al.

(10) Patent No.: US 12,009,198 B1
(45) Date of Patent: Jun. 11, 2024

(54) ULTRAVIOLET RAY GENERATION DEVICE

(71) Applicant: Ushio Denki Kabushiki Kaisha, Tokyo (JP)

(72) Inventors: Akihiro Kuno, Tokyo (JP); Hideaki Yagyu, Tokyo (JP); Shigeki Fujisawa, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/555,367

(22) PCT Filed: Apr. 15, 2022

(86) PCT No.: PCT/JP2022/017928
§ 371 (c)(1),
(2) Date: Oct. 13, 2023

(87) PCT Pub. No.: WO2022/220296
PCT Pub. Date: Oct. 20, 2022

(30) Foreign Application Priority Data

Apr. 16, 2021 (JP) ................................. 2021-069570
Apr. 15, 2022 (JP) ................................. 2022-067346

(51) Int. Cl.
*H01J 61/16* (2006.01)
*H01J 61/54* (2006.01)
*H01J 65/00* (2006.01)

(52) U.S. Cl.
CPC .............. *H01J 61/54* (2013.01); *H01J 61/16* (2013.01); *H01J 65/00* (2013.01)

(58) Field of Classification Search
CPC ............. H01J 61/54; H01J 61/16; H01J 65/00
See application file for complete search history.

(56) References Cited

U.S. PATENT DOCUMENTS 11,295,946 B2 * 4/2022 Yoon ..................... H01J 65/046
2021/0393825 A1 * 12/2021 Callahan ............... H01J 61/305
2021/0393837 A1 * 12/2021 Brockschmidt, Jr. ........................ H01J 61/0672

FOREIGN PATENT DOCUMENTS

JP 2012-190676 A 10/2012

OTHER PUBLICATIONS

International Search Report issued in PCT/JP2022/017928; mailed Jun. 7, 2022.
Notification of Transmittal of Translation of the International Preliminary Report on Patentability and Translation of Written Opinion of the International Searching Authority; PCT/JP2022/017928; mailed on Oct. 26, 2023.

* cited by examiner

*Primary Examiner* — Anne M Hines
(74) *Attorney, Agent, or Firm* — Studebaker & Brackett PC

(57) ABSTRACT

The startability of an ultraviolet ray generation device including an excimer lamp as an ultraviolet light source is to be improved. An ultraviolet ray generation device includes: an excimer lamp having a discharge container in which a discharge gas is sealed; a first electrode body and a second electrode body that are disposed so as not to be exposed to the discharge gas; and a first conductor electrically connected to one of the first electrode body and the second electrode body. The first conductor faces the other electrode body or a second conductor electrically connected to the other electrode body, through a dielectric member. The first conductor causes an atmospheric discharge around the first conductor.

8 Claims, 16 Drawing Sheets

ULTRAVIOLET RAY GENERATION DEVICE

TECHNICAL FIELD

The present invention relates to an ultraviolet ray generation device, and particularly relates to an ultraviolet ray generation device including an excimer lamp as an ultraviolet light source.

BACKGROUND ART

A conventional excimer lamp including a pair of external electrodes disposed opposite from each other on an outer surface of a discharge container is known, and it is known that a first conductor made of a conductive substance is disposed on an inner surface of the discharge container to improve startability (as disclosed, for example, in Patent Document 1 below).

In Patent Document 1, external electrodes are provided with a branch-shaped electrode that includes a root part extending from an end in a tube axis direction of the external electrode along a tube axis direction of a discharge container and a branch part extending from a distal end of the root part in a width direction of the discharge container. A first conductor is disposed so as to overlap a distal end of the branch part of the branch electrode of the external electrode through the discharge container. According to this configuration, at the time of starting an excimer lamp, a high-frequency current applied to one of the external electrodes is in a state of a kind of capacitor coupling, and the high-frequency current flows to the other external electrode through a wall of a dielectric substance constituting the discharge container, so that an electric discharge tends to occur and startability is improved.

PRIOR ART DOCUMENT

Patent Document

Patent Document 1: JP-A-2012-190676

SUMMARY OF THE INVENTION

Problems to be Solved by the Invention

The excimer lamp can emit light having an emission wavelength that varies with a type of a sealed-in light-emitting gas. However, there is a case in which adopting the configuration described in Patent Document 1 is difficult depending on the type of the sealed-in light-emitting gas. For instance, if a noble gas and a halogen gas are sealed in the discharge container, it is difficult to form the first conductor inside the discharge container because the halogen gas displays high reactivity and is absorbed by the conductive substance. Hence, the technique described in Patent Document 1 is not highly versatile as a means for improving startability of the excimer lamp.

In view of the above problem, it is an object of the present invention to improve the startability of an ultraviolet ray generation device including an excimer lamp as an ultraviolet light source.

Means for Solving the Problems

An ultraviolet ray generation device according to the present invention includes:

- an excimer lamp having a discharge container in which a discharge gas is sealed;
- a first electrode body and a second electrode body that are disposed so as not to be exposed to the discharge gas; and
- a first conductor electrically connected to one of the first electrode body and the second electrode body,
- in which
- the first conductor has a portion facing an other electrode body or a second conductor electrically connected to the other electrode body, through a dielectric member, and
- the first conductor causes an atmospheric discharge around the first conductor.

According to this configuration, it is possible to cause an atmospheric discharge around the first conductor through use of a voltage applied to the first electrode body and the second electrode body. Light emission due to the atmospheric discharge induces excimers to be excited in the discharge container of the excimer lamp. This improves the startability of the excimer lamp. The atmospheric discharge described herein refers to a discharge phenomenon that occurs in the atmosphere and specifically indicates a corona discharge, a creeping discharge or such a phenomenon that occurs in the atmosphere.

The first conductor faces the other electrode body or the second conductor electrically connected to the other electrode body, through the dielectric member, causing an atmospheric discharge. More specifically, an atmospheric discharge occurs at a starting point, i.e., a distal end of the first conductor or a region put in point contact with the dielectric member, at which electric field strength tends to be concentrated. In this way, the first conductor includes a discharge starting point at which electric field strength tends to be concentrated, and the starting point desirably has a positional relationship such that the starting point and an electrode body at an electric potential shared with the other electrode body or the second conductor electrically connected to the electrode body face each other through the dielectric member. It is desirable that the first conductor includes a plurality of such discharge starting points. According to this configuration, even if one of the starting points becomes less apt to function (an electric discharge is less apt to occur), the other starting point functions and thus the startability of the ultraviolet ray generation device is less apt to be impaired.

In the ultraviolet ray generation device according to the present invention, the dielectric member may be a member distinct from the discharge container.

When the dielectric member is a member distinct from the discharge container, a thickness of the dielectric member can be freely adjusted. Adjusting appropriately the thickness of the dielectric member makes it possible to reduce consumption of electrical energy in the atmospheric discharge when the excimer lamp is lit.

In the ultraviolet ray generation device according to the present invention, a thickness of the dielectric member interposed between the first conductor and either the other electrode body or the second conductor (a shortest distance) may be smaller than a sum of a thickness of the discharge container interposed between the first electrode body and the discharge gas and a thickness of the discharge container interposed between the second electrode body and the discharge gas.

According to this configuration, in response to a voltage applied to the first electrode body and the second electrode body, insulation breakdown tends to occur between the first conductor and the other electrode body or the second conductor before insulation is broken down inside the discharge container.

The thickness of the dielectric member interposed between the first conductor and either the other electrode body or the second conductor (the shortest distance) is desirably 30% or greater and more desirably 50% or greater of the sum of the thickness of the discharge container interposed between the first electrode body and the discharge gas and the thickness of the discharge container interposed between the second electrode body and the discharge gas.

This configuration helps to weaken the atmospheric discharge between the first conductor and the other electrode body or the second conductor after insulation is broken down inside the discharge container (after an electric discharge starts inside the discharge container) in response to a voltage applied to the first electrode body and the second electrode body. Thus, an amount of current consumed in the atmospheric discharge is likely to decrease after the excimer lamp starts. This is likely to suppress a decrease in electric power to the excimer lamp and suppress a decrease in irradiance. The atmospheric discharge is weakened after the start of an electric discharge. This helps to reduce wear of the first conductor, which causes an atmospheric discharge.

In the ultraviolet ray generation device according to the present invention, the first conductor may be made of at least one conductive material selected from aurum, platinum, tungsten, titanium, aluminum, and stainless steel or an alloy of the conductive material.

A material that does not display deliquescence is suitable for the material that the first conductor, which is used to assist the excimer lamp with starting, is made of. $NO_X$ gas is generated in response to a discharge around the first conductor, and $NO_X$ gas reacts with moisture in the atmosphere and becomes $HNO_3$ (nitric acid). When the first conductor is soaked in nitric acid, nitrate is formed on the first conductor. Most nitrate absorbs moisture from the atmosphere and can be dissolved in the water and be liquefied (this is referred as deliquescence). Since the deliquescent substance is formed, a liquefied substance is formed around the first conductor. As a result, an atmospheric discharge is less apt to occur. The tube wall temperature of many discharge lamps rises and when the temperature around the lamp is high, the amount of moisture in the atmosphere is small and the problem above is less likely to occur. However, for a dielectric barrier discharge lamp according to the present invention, the temperature of the discharge container is relatively less apt to rise, and the problem of deteriorating startability due to deliquescence tends to be actualized. Hence, in the ultraviolet ray generation device according to the present invention, the first conductor is desirably made of any of the materials listed above that display high nitrate tolerance in order not to form a deliquescent substance.

In the ultraviolet ray generation device according to the present invention, the first conductor is preferably made of at least one conductive material selected from aurum, platinum, and tungsten or an alloy of the conductive material.

Titanium, aluminum, and stainless steel described above cause an oxide coating to be formed on the metal surface and thereby possess nitrate tolerance. However, there is a conceivable case in which an atom without an oxide coating reacts with nitric acid due in part to a sputter at a discharge area caused by the atmospheric discharge. Hence, the first conductor is preferably made of a material (aurum, platinum, and tungsten) that does not cause an atom without an oxide coating to react with nitric acid.

The ultraviolet ray generation device according to the present invention may be configured such that the first conductor extends in a rod shape toward the other electrode body or the second conductor, and the first conductor causes an atmospheric discharge (a corona discharge in this example) at a distal end of the first conductor as a starting point.

In the ultraviolet ray generation device according to the present invention, the second conductor may include a planar portion facing the distal end of the first conductor.

These configurations cause a corona discharge at the distal end of the first conductor, which acts as a starting point, and light emission due the corona discharge helps to improve the startability of the excimer lamp.

The ultraviolet ray generation device according to the present invention may be configured such that the first conductor extends so as to be planar and face the other electrode body or the second conductor, and the first conductor causes a creeping discharge along a surface of the dielectric member with the first conductor as a starting point.

This configuration causes a creeping discharge with the distal end of the first conductor as a starting point, and light emission due the creeping discharge helps to improve the startability of the excimer lamp.

MODE FOR CARRYING OUT THE INVENTION

Figure 1:
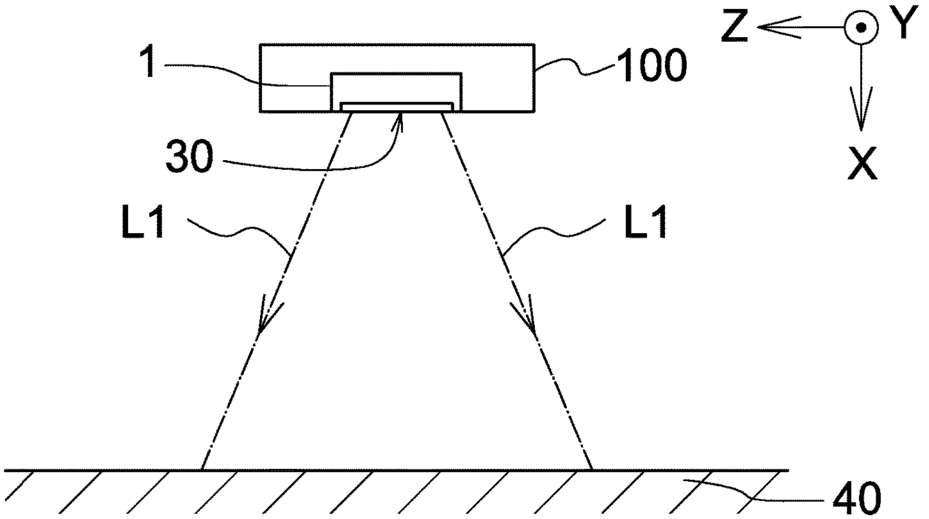
FIG. 1 is a schematic view showing one mode of use of an ultraviolet ray generation device according to the present invention.

Each embodiment of an ultraviolet ray generation device according to the present invention is described with reference to the drawings as appropriate. The drawings referred to below present schematic illustrations and the dimensional ratios in the drawings are not necessarily the same as the actual dimensional ratios. The dimensional ratios in various figures of the drawings are not necessarily the same, either.

First Embodiment

FIG. 1 is a schematic view showing one mode of use of an ultraviolet ray generation device according to the present invention. FIG. 1 schematically shows how an area 40 to be irradiated is irradiated with ultraviolet rays L1 emitted through a light extraction face 30 of an ultraviolet ray generation device 1 installed in a housing 100.

Figure 2:
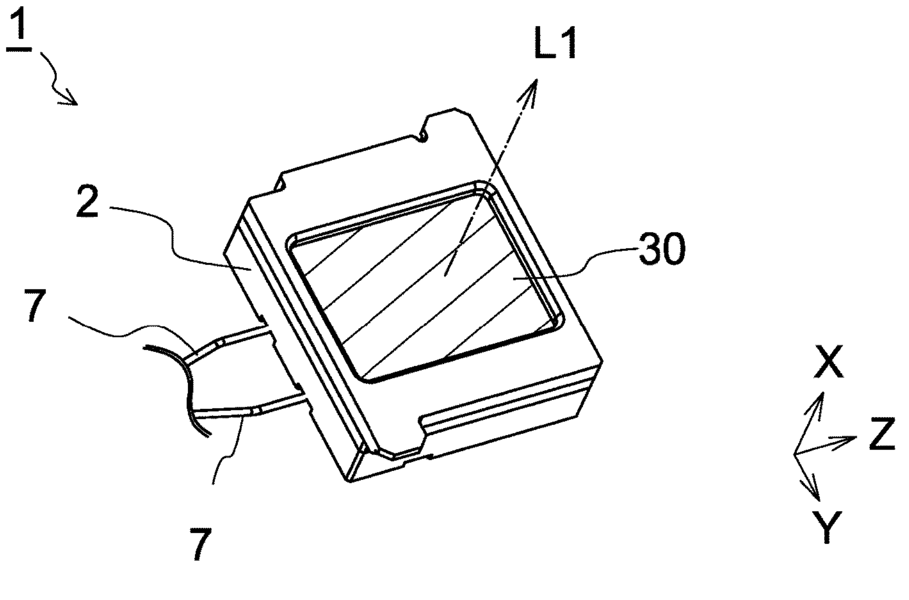
FIG. 2 is a perspective view schematically showing an example of an external appearance of an ultraviolet ray generation device.
Figure 3:
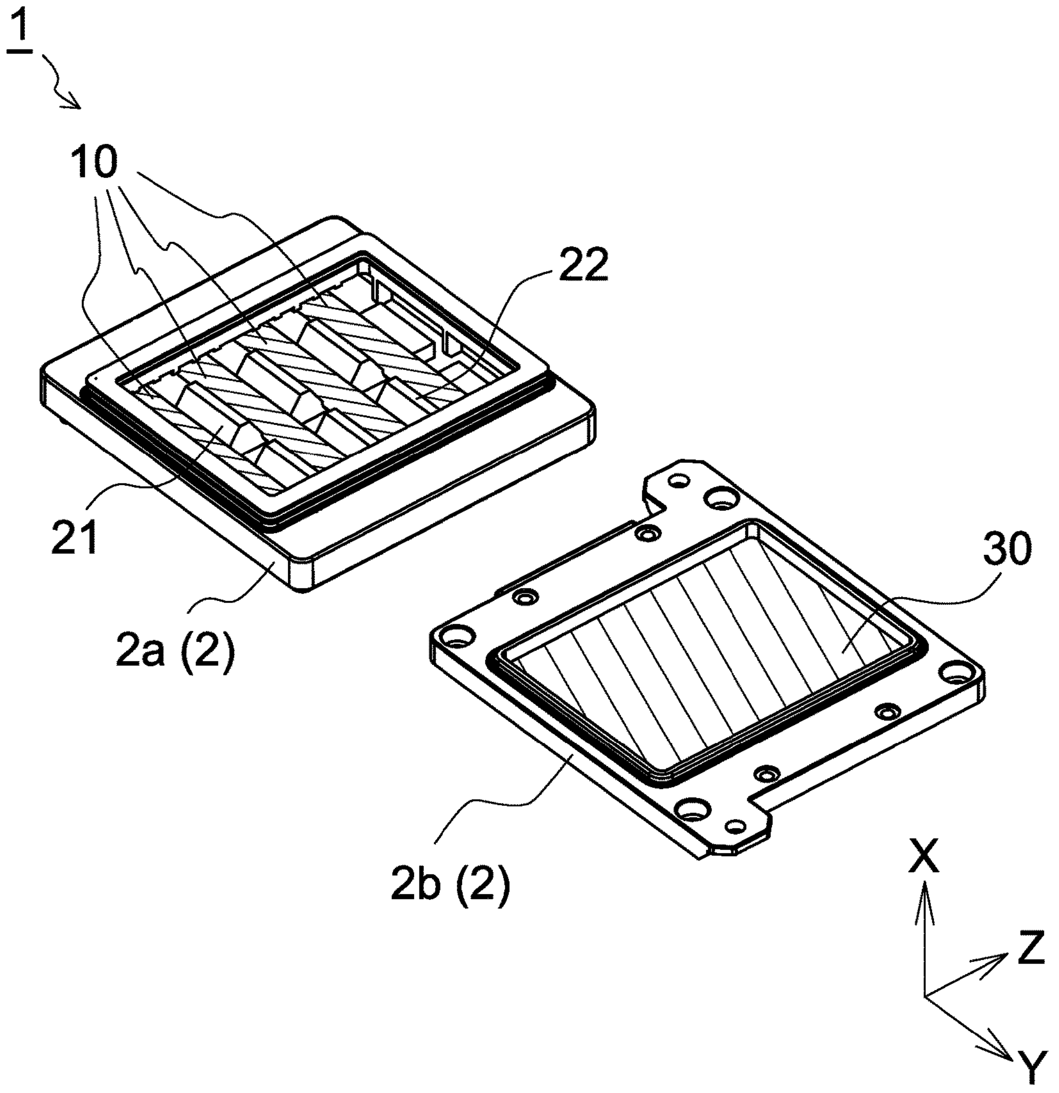
FIG. 3 is an exploded perspective view of FIG. 2, in which a casing is separated into a main body and a lid.

FIG. 2 is a perspective view schematically showing an example of an external appearance of the ultraviolet ray generation device 1. FIG. 3 is an exploded perspective view of FIG. 2, in which a casing 2 of the ultraviolet ray generation device 1 is separated into a main body 2*a* and a lid 2*b*.

Each of the following drawings will be described with reference to an X-Y-Z coordinate system in which a direction in which the ultraviolet rays L1 are extracted is defined as an X direction and a plane orthogonal to the X direction is defined as a YZ plane. More specifically, as will be described later with reference to FIG. 2 and subsequent drawings, a tube axis direction of an excimer lamp 10 is defined as a Y direction, and a direction orthogonal to the X direction and the Y direction is defined as a Z direction.

In the following description, in the case of distinguishing whether the direction is positive or negative, the positive or negative symbol is added, such as the "+X direction" or the "−X direction". In the case where there is no need to distinguish between positive and negative directions, the direction is simply described as the "X direction". Namely, in the present specification, in the case where the direction is simply described as the "X direction", both "+X direction" and "−X direction" are included. The same applies to the Y direction and the Z direction.

As shown in FIGS. 2 and 3, the ultraviolet ray generation device 1 includes the casing 2 that has the light extraction face 30 formed on one surface. The casing 2 includes the main body 2*a* and the lid 2*b*, and the main body 2*a* houses a plurality of excimer lamps 10 and electrode bodies 21, 22 therein. In this embodiment, four excimer lamps 10 are housed in the casing 2 by way of example. The electrode bodies 21, 22 can form a shape that enables a flow of electricity to the excimer lamps 10 and may be, for example, in a block shape, a plate shape, or a net shape so as to be put into contact with a discharge container 11 of each excimer lamp 10.

Figure 4:
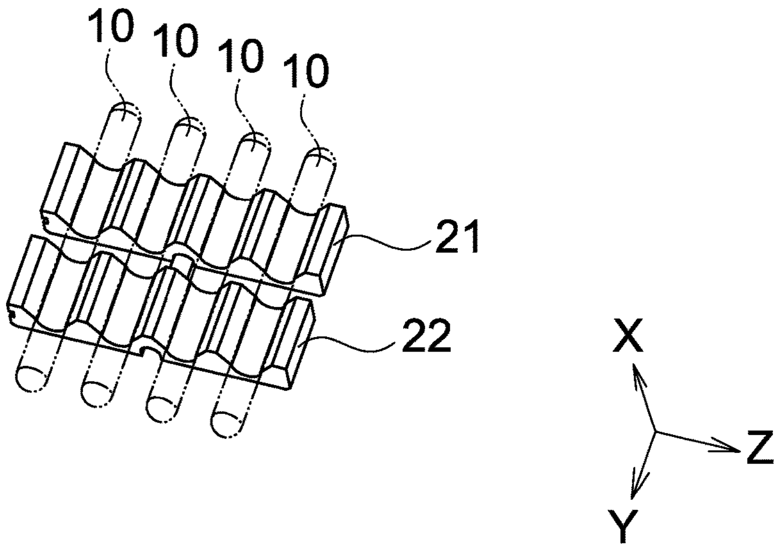
FIG. 4 is a schematic perspective view of a plurality of excimer lamps and electrode bodies extracted from FIG. 3.
Figure 5:
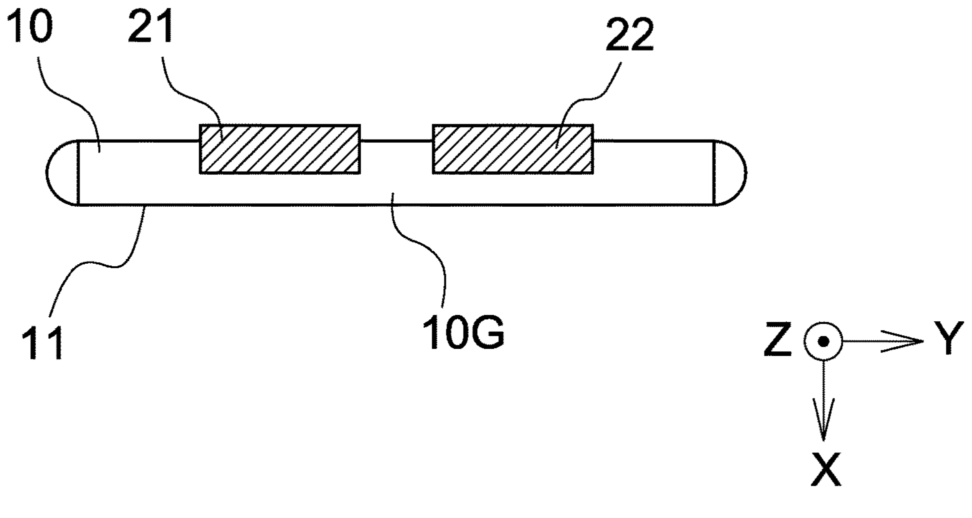
FIG. 5 is a schematic plan view for explaining a positional relationship between the excimer lamps and the electrode bodies, which is obtained by viewing the excimer lamps in a +Z direction.

FIG. 4 is a perspective view of the plurality of the excimer lamps 10 and the electrode bodies 21, 22 extracted from FIG. 3. FIG. 5 is a side view schematically showing a positional relationship between the excimer lamps 10 and the electrode bodies 21, 22.

As shown in FIG. 4, the ultraviolet ray generation device 1 according to this embodiment includes the four excimer lamps 10 arranged so as to be separated from each other in the Z direction. Further, the two electrode bodies 21, 22 are disposed so as to be in contact with a portion of an outer surface of each of the excimer lamps 10. The electrode body 21 and the electrode body 22 may be hereinafter referred to as a first electrode body 21 and a second electrode body 22, respectively.

Each of the excimer lamps 10 has the discharge container 11 with the tube axis direction extending along the Y direction, and the outer surfaces of the discharge containers 11 of the excimer lamps 10 are partly in contact with the electrode bodies 21, 22 at positions separated in the Y direction. In other words, the electrode bodies 21, 22 are disposed so as to extend across the excimer lamps 10 in the Z direction while being in contact with the outer surfaces of the discharge containers 11 of the excimer lamps 10.

As described above, the ultraviolet ray generation device 1 according to this embodiment includes a pair of the electrode bodies 21, 22 that are disposed at positions separated from each other in the Y direction. The electrode bodies 21, 22 are made of a conductive material, preferably a material exhibiting reflectivity to ultraviolet rays emitted from the excimer lamps 10. In one example, the electrode bodies 21, 22 are made of aluminum, an aluminum alloy, stainless steel, or the like.

When a high-frequency alternating current (AC) voltage of, for example, about 1 kHz to 5 MHz is applied between the electrode bodies 21, 22, the voltage is applied to a discharge gas 10G sealed inside the discharge container 11 of each of the excimer lamps 10 through the discharge container 11. A gas type of the discharge gas 10G is not particularly limited as long as atoms constituting the gas type are excited or ionized into an excimer state by the application of such voltage and then excimer light is emitted when the atoms are returned to a ground state. More specifically, the discharge gas 10G may be one or more of noble gases such as argon (Ar), krypton (Kr), and xenon (Xe) or a mixed gas of the noble gas and a halogen gas such as fluorine (F), chlorine (Cl), iodine (I), or bromine (Br).

In one example, the discharge gas 10G may be a mixed gas of krypton (Kr), chlorine (Cl), and argon (Ar). It is to be noted that in this case, krypton and chlorine function as a light-emitting gas and argon functions as a buffer gas. As a buffer gas, at least one noble gas selected from argon (Ar), neon (Ne), and helium (He) can be used.

An excimer lamp 10 containing, as the discharge gas 10G, a mixed gas of Kr and $Cl_2$ emits ultraviolet rays having a peak wavelength of about 222 nm. Even when the skin of a human body is exposed to an ultraviolet ray in a wavelength band of 190 nm or more and 235 nm or less including 222 nm, the ultraviolet ray is absorbed by the stratum corneum of the skin and does not reach layers deeper than the stratum corneum (layers on the substratum side). Corneocytes contained in the stratum corneum are dead cells, and therefore, unlike the case of irradiation with an ultraviolet ray having a wavelength of, for example, 254 nm, there is hardly any risk that the ultraviolet ray is absorbed by living cells in the stratum spinosum, the stratum granulosum, and the dermis so that DNA is destroyed.

It is known that ultraviolet rays in the above-described wavelength band have a sterilization effect on an object irradiated therewith. Therefore, an ultraviolet ray generation device equipped with excimer lamps containing a sealed-in discharge gas as described above is expected to be used in various applications such as photosterilization and is considered to be used in a wide variety of situations.

Figure 6:
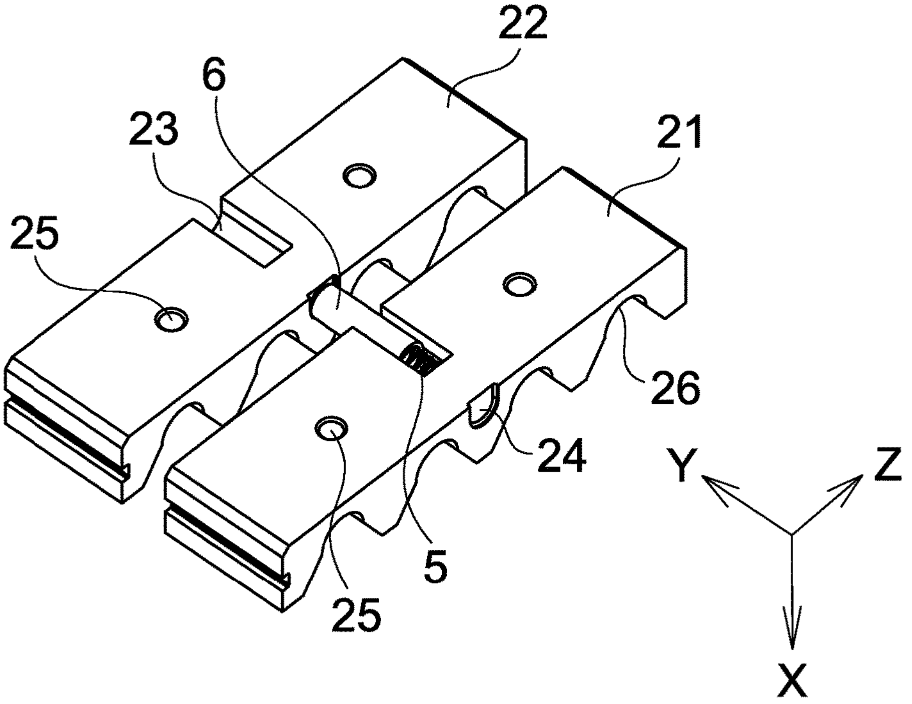
FIG. 6 is a perspective view of the electrode bodies viewed from a side opposite a light extraction face.
Figure 7:
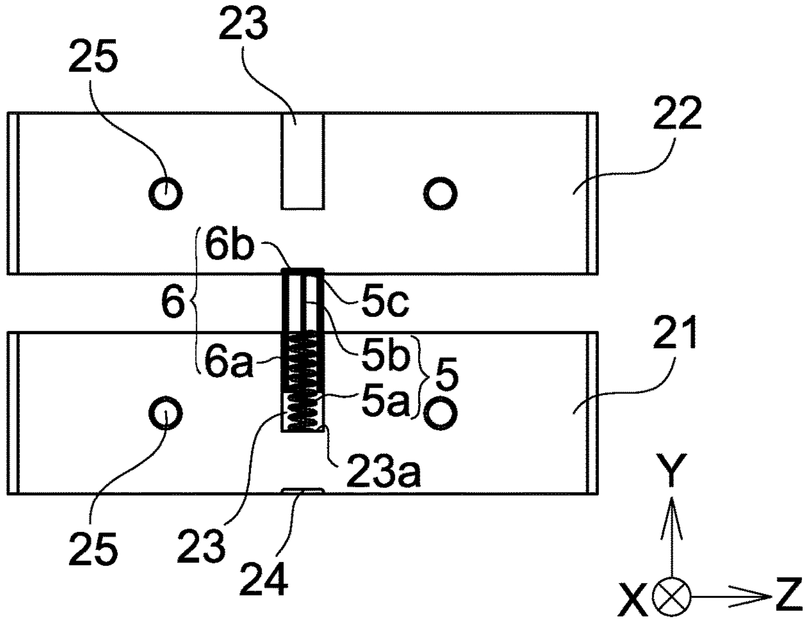
FIG. 7 is a plan view of the electrode bodies viewed from the side opposite the light extraction face.

FIG. 6 is a perspective view of the electrode bodies 21, 22 in the shape of a block viewed from a side opposite the light extraction face 30. FIG. 7 is a plan view of the electrode bodies 21, 22 viewed from the side opposite the light extraction face 30. In FIG. 7, a dielectric member 6 described later is shown in a cross-sectional view.

The electrode bodies 21, 22 have a common shape. A first recess 23 and a second recess 24 are formed in a surface on an −X side of each of the electrode bodies 21, 22. The first recess 23 extends in a −Y direction from a surface on a +Y side of each of the electrode bodies 21, 22. The second recess 24 extends in a +Y direction from a surface on an −Y side of each of the electrode bodies 21, 22. The first recess 23 and the second recess 24 are disposed so as to be opposite to each other in the Y direction. The first recess 23 and the second recess 24 are formed in a middle in the Z direction of each of the electrode bodies 21, 22.

The surface on the −X side of each of the electrode bodies 21, 22 has a screw hole 25 to which a power wire 7 (see FIG. 2) is connected. The power wire 7 on a high-voltage side is connected to the screw hole 25 of the first electrode body 21, and the power wire 7 on a low-voltage side is connected to the screw hole 25 of the second electrode body 22. However, the power wire 7 on the low-voltage side may be connected to the screw hole 25 of the first electrode body 21, and the power wire 7 on the high-voltage side may be connected to the screw hole 25 of the second electrode body 22.

A third recess 26 is formed in a surface on a +X side of each of the electrode bodies 21, 22 and is put into contact with the outer surface of the discharge container 11 of the excimer lamp 10. Four pieces of the third recesses 26 are provided at equal intervals in the Z direction. The first recess 23 and the second recess 24 are disposed between the two third recesses 26 in the middle.

The ultraviolet ray generation device 1 according to this embodiment includes a first conductor 5. The first conductor 5 is installed to assist the excimer lamps 10 with starting. The first conductor 5 is electrically connected to the first electrode body 21.

In this embodiment, the first conductor 5 includes a proximal part 5*a* in the shape of a spring and a distal part 5*b* in the shape of a rod and has elasticity as a whole. The proximal part 5*a* is electrically connected to the first electrode body 21. The proximal part 5*a* is disposed inside the first recess 23 in the first electrode body 21 and is in contact with an inner wall 23*a* on the −Y side of the first recess 23. The proximal part 5*a* is pressed against the inner wall 23*a* of the first recess 23 by an elastic force of the proximal part 5*a*.

In this embodiment, the first conductor 5 includes the spring-shaped proximal part 5*a* and the rod-shaped distal part 5*b*. However, the shape of the first conductor 5 is not limited to this. The first conductor 5 may have, for example, a column shape, a rod shape, or a sheet shape as a whole. In addition, the shape of the distal part 5*b* of the first conductor 5 is not limited to a rod shape but may be a sheet shape or the like. Preferably, a distal end 5*c* of the distal part 5*b* is sharp-pointed. This causes electric field strength to be concentrated at the distal end 5*c* of the first conductor 5 and thus electric discharge tends to occur at the distal end 5*c* of the first conductor 5.

The first conductor 5 is made of a material that has conductivity. Preferably, the first conductor 5 is made of at least one conductive material selected from aurum, platinum, tungsten, titanium, aluminum, and stainless steel or an alloy of any of these conductive materials. More preferably, the first conductor 5 is made of at least one conductive material selected from aurum, platinum, and tungsten or an alloy of any of these conductive materials.

The dielectric member 6 is interposed between the first conductor 5 and the second electrode body 22. Specifically, the dielectric member 6 is interposed between the distal part 5*b* extending toward the second electrode body 22 in the Y direction and the second electrode body 22.

In the present specification, "a dielectric member is interposed between a first conductor and a second electrode body or a second conductor" means that the dielectric member is simply present between the first conductor and the second electrode body or the second conductor, and the dielectric member may be or may not be in contact with both the parts. Specifically, in the present embodiment, the dielectric member 6 is present between the first conductor 5 and the second electrode body 22, and may be or may not be in contact with the first conductor 5 and the second electrode body 22. Another member may be present between the dielectric member 6 and either the first conductor 5 or the second electrode body 22. Similarly, "A is interposed between B and C" hereinafter means that A is simply present between B and C.

The dielectric member 6 according to this embodiment has a tubular shape with closed one end. More specifically, the dielectric member 6 has a bottomed tubular shape including a tubular part 6*a* and a bottom part 6*b* to close one end of the tubular part 6*a*. A shape of the tubular part 6*a* is not limited to a cylindrical shape but may be another shape such as a square tubular shape. A shape of the bottom part 6*b* is not limited to a planar shape but may be another shape such as a hemispherical shape.

The dielectric member 6 is held by the first recess 23 of the first electrode body 21 and the second recess 24 of the second electrode body 22. The tubular part 6*a* of the dielectric member 6 is slightly smaller than the first recess 23, and the bottom part 6*b* is slightly smaller than the second recess 24.

The dielectric member 6 is disposed so as to cover the distal end 5*c* of the first conductor 5. The distal end 5*c* of the first conductor 5 is pressed against the bottom part 6*b* of the dielectric member 6 by an elastic force of the proximal part 5*a*.

Preferably, the dielectric member 6 is made of a material that displays high insulation performance, high mechanical strength, and high transmittance to ultraviolet rays. In one example, the dielectric member 6 is made of a ceramic material such as quartz glass and alumina or a resin such as PTFE.

When the ultraviolet ray generation device 1 is operated, high-frequency voltage is applied between the electrode bodies 21, 22 as described above through the power wires 7 (see FIG. 2) from a power source not shown. This allows the high-frequency voltage to be applied to the discharge gas 10G sealed within each of the excimer lamps 10 through the discharge container 11.

In the excimer lamps 10, in response to high-frequency voltage applied between the electrode bodies 21, 22, insulation is broken down in a discharge space (in the discharge container 11) and excimer emission thereby occurs. When the insulation is broken down, the excimer lamps 10 repeat discharging photons and finishing the discharge in ns order and do these actions at high frequencies. As a result, it appears that the lamps are essentially continuously lit.

Meanwhile, if a halogen gas is sealed in the excimer lamps 10, electrons are absorbed due to a high electron affinity of the halogen gas and the excimer lamps 10 are put into a state in which an electric current is less apt to flow (electrons are less apt to move) without continuous lighting. Thus, irradiating the discharge space with light with a wavelength having energy close to excitation energy for excimer emission is necessary to improve startability of the excimer lamps 10. This induces excimers to be excited in the discharge space (an electric discharge is ready to occur).

In the ultraviolet ray generation device 1 according to this embodiment, a voltage is applied between the electrode bodies 21, 22 and concurrently a voltage is applied between the first conductor 5 connected to the first electrode body 21 and the second electrode body 22. At this time, a distance between the first conductor 5 and the second electrode body 22 is shorter than a distance between the first electrode body 21 and the second electrode body 22. Thus, insulation breakdown occurs first at a low voltage in a space between the first conductor 5 and the second electrode body 22, and the first conductor 5 causes a corona discharge at the distal end 5*c* as a starting point. As a result, ultraviolet rays are emitted from the distal end 5*c* of the first conductor 5. A band of wavelengths that the ultraviolet rays have includes 226 to 227 nm. It is inferred that the discharge is attributed to nitrogen, a main ingredient in the atmosphere.

Light emission by the first conductor 5 due to the atmospheric discharge induces excimers to be excited in the discharge space of the excimer lamps 10 (a discharge occurs). Thus, when the ultraviolet rays from the first conductor 5 enter the excimer lamps 10 in a state where a voltage is applied to the discharge gas 10G through the electrode bodies 21, 22, the excimer lamps 10 become lit in a short time (e.g., within 0 seconds to 2 seconds) by this optical energy as a trigger. When the discharge gas 10G contains krypton (Kr) and chlorine (Cl), light emitted from the excimer lamps 10 is ultraviolet rays having a peak wavelength of 222 nm.

After the excimer lamps 10 are lit, the first conductor 5 also remains lit as-is. However, this does not have an influence on irradiance of the excimer lamps 10 because electricity used for the first conductor 5 is slight. Further, the influence decreases because the discharge inside the lamps acts independently and the atmospheric discharge at the first conductor 5 tends to be suppressed after the excimer lamps 10 are lit.

A characteristic of the first conductor 5 is that the voltage is also distributed to the excimer lamps 10 after the excimer lamps 10 are lit, and hence the voltage applied to the first conductor 5 is lower than the voltage at the time of starting and a load on the first conductor 5 is light during continuous lighting. This makes the life of the first conductor 5 long as a trigger.

As described above, the ultraviolet ray generation device 1 according to the first embodiment includes the excimer lamps 10 each having the discharge container 11 in which the discharge gas 10G is sealed, the first electrode body 21 and the second electrode body 22 that are disposed so as not to be exposed to the discharge gas 10G, and the first conductor 5 electrically connected to the first electrode body 21. The first conductor 5 and the second electrode body 22 face each other through the dielectric member 6, and the first conductor 5 causes an atmospheric discharge (a corona discharge) around the distal end 5*c* of the first conductor 5, which is a starting point of the discharge.

In the present specification, the description of the first electrode body 21 and the second electrode body 22 that are "disposed so as not to be exposed to the discharge gas" includes not only a configuration in which the first electrode body 21 and the second electrode body 22 are disposed so as to be put into contact with the outer surfaces of the discharge containers 11 containing the sealed-in discharge gas 10G but also a configuration in which the first electrode body 21 and the second electrode body 22 are partly mounted into the outer surfaces of the discharge containers 11 and a configuration in which the first electrode body 21 and the second electrode body 22 are fully mounted into the discharge containers 11.

Figure 15:
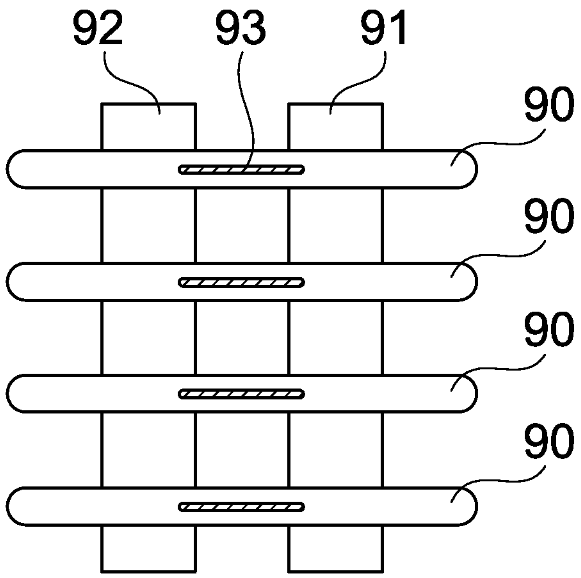
FIG. 15 is a plan view schematically showing electrode bodies according to a conventional technique.

The first conductor 5 is disposed outside the discharge containers 11. For instance, as shown in FIG. 15, electrode blocks 91, 92 are disposed in a longitudinal direction of excimer lamps 90 such that outer surfaces of discharge containers are put into contact with the electrode blocks 91, 92. The excimer lamps 90 cause an electric discharge by applying a high voltage between the electrode blocks 91, 92. If the technique described in Patent Document 1 is applied to the excimer lamps 90 and a first conductor 93 is disposed on an inner surface of each of the discharge containers, the electric discharge is concentrated in a vicinity of the first conductor 93. This decreases efficiency with which ultraviolet rays are radiated.

Although the embodiment of the present invention has been described above with reference to the drawings, it should be understood that specific configurations are not limited to these embodiments. The scope of the present invention is indicated not only by the above description of the embodiment but also by the claims, and all changes which come within the meaning and range of equivalency of the claims are therefore intended to be embraced therein.

The structure adopted in each embodiment described above can be adopted in any other embodiment. Specific configurations of parts are not limited only to those in the above-described embodiment, and various modifications can be made without departing from the spirit of the present invention.

Other Embodiments

Figure 8A:
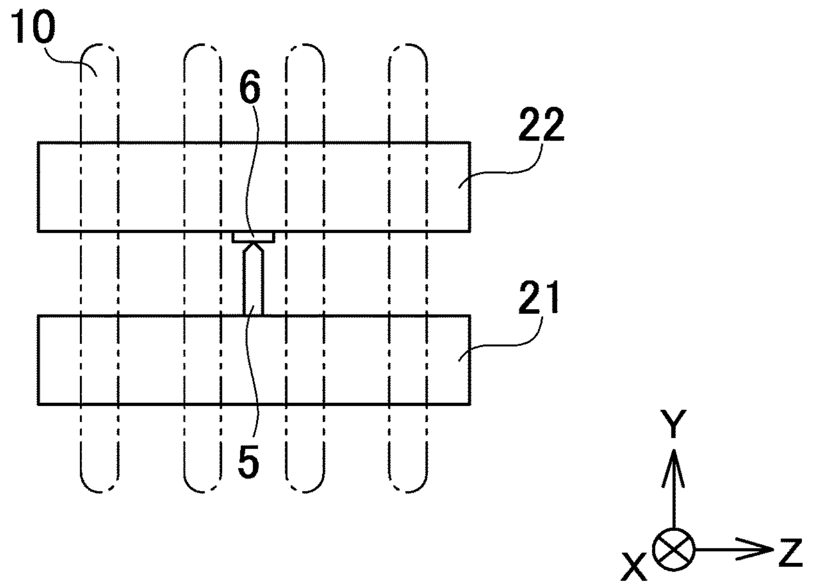
FIG. 8A is a plan view schematically showing electrode bodies according to another embodiment.

A combination of the first conductor 5 and the dielectric member 6 is not limited to the above configuration. FIG. 8A is a plan view schematically showing the ultraviolet ray generation device 1 according to another embodiment. In this example, the first conductor 5 is in the shape of a rod having a sharp-pointed distal end. The dielectric member 6 is in the shape of a flat plate being parallel to the XZ plane. The first conductor 5 and the dielectric member 6 are not necessarily put into contact with each other but may be disposed at a degree of spacing that allows an electric discharge. The first conductor 5 is not necessarily in the shape of a rod having a sharp-pointed distal end. For instance, the first conductor 5 in the shape of a rectangular plate has two corners that each can be a starting point of discharge.

Figure 8B:
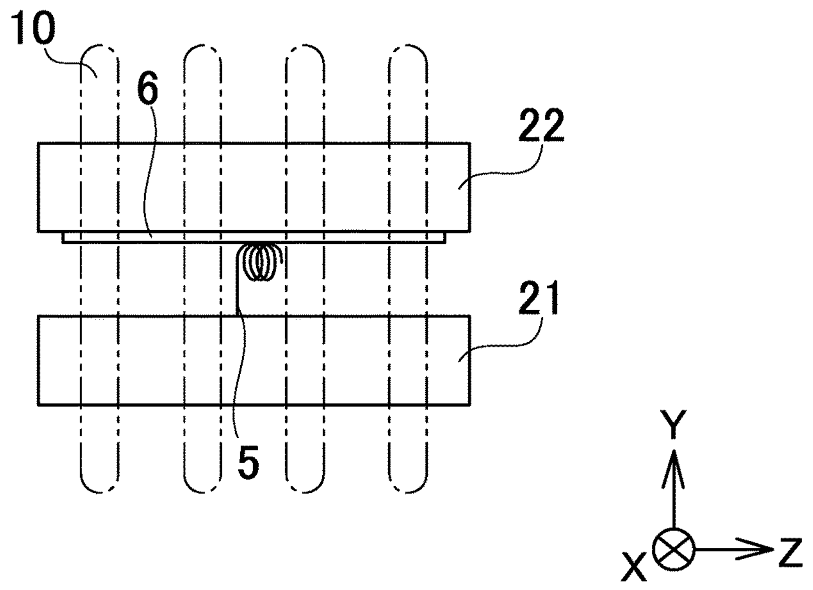
FIG. 8B is a plan view schematically showing electrode bodies according to another embodiment.

FIG. 8B is a plan view schematically showing the ultraviolet ray generation device 1 according to still another embodiment. In this example, the first conductor 5 includes a coiled part. The dielectric member 6 is in the shape of a flat plate being parallel to the XZ plane. The first conductor 5 and the dielectric member 6 are not necessarily put into contact with each other but may be disposed at a degree of spacing that allows an electric discharge. An atmospheric discharge occurs at a region as a starting point at which the coiled part of the first conductor 5 is in point contact with (or adjacent to) the dielectric member 6. Since the first conductor 5 includes the coiled part, there are a plurality of regions (starting points) at which the first conductor 5 is in point contact with the dielectric member 6.

Figure 9:
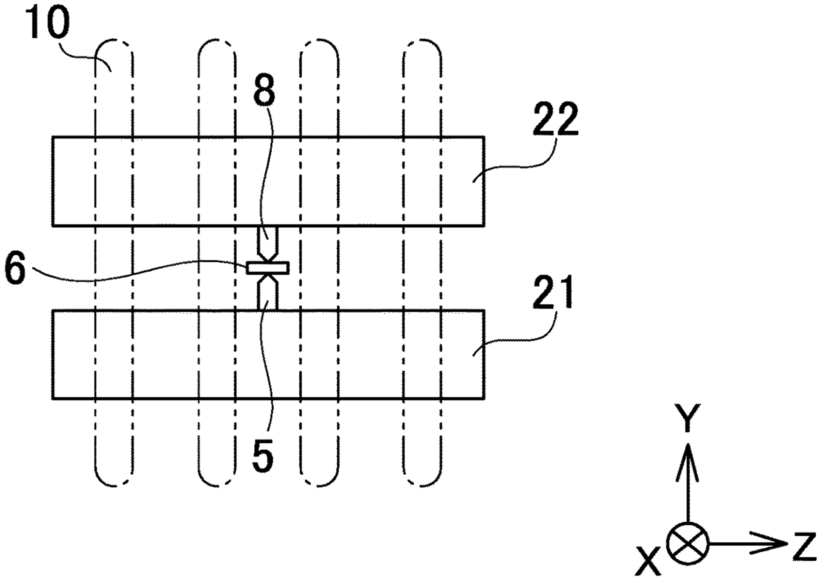
FIG. 9 is a plan view schematically showing electrode bodies according to another embodiment.

FIG. 9 is a plan view schematically showing the ultraviolet ray generation device 1 according to still another embodiment. In this example, a second conductor 8 is electrically connected to the second electrode body 22. The second electrode body 22 is at an electric potential shared with the second conductor 8. In other words, the first conductor 5 being connected to the first electrode body 21 and extending toward the second electrode body 22 and the second conductor 8 being connected to the second electrode body 22 and extending toward the first electrode body 21 are disposed. The dielectric member 6 is interposed between the first conductor 5 and the second conductor 8. In this way, the first conductor 5 may face a portion (the second conductor 8 in this example) at the electric potential shared with the second electrode body 22 through the dielectric member 6.

Second Embodiment

A second embodiment is similar in configuration to the first embodiment except for components described below. Therefore, descriptions of the common points will be omitted and differences will be primarily described. In the second embodiment, elements having structures or functions (effects) substantially similar to those described in the first embodiment are represented, and descriptions thereof will not be repeated.

Figure 10:
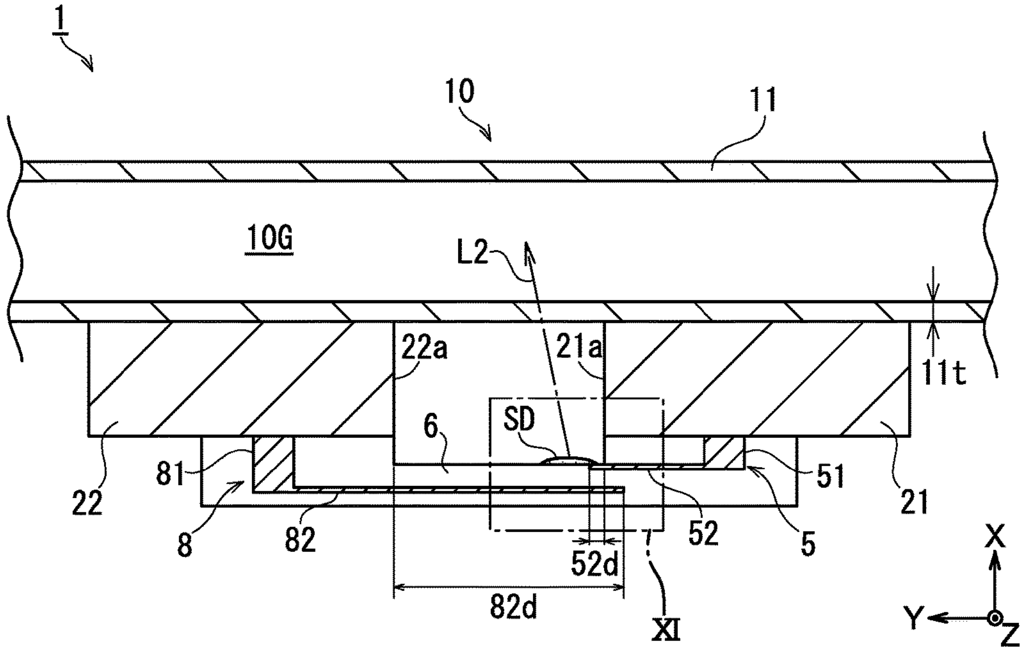
FIG. 10 is a cross-sectional view schematically showing an ultraviolet ray generation device according to a second embodiment.
Figure 11:
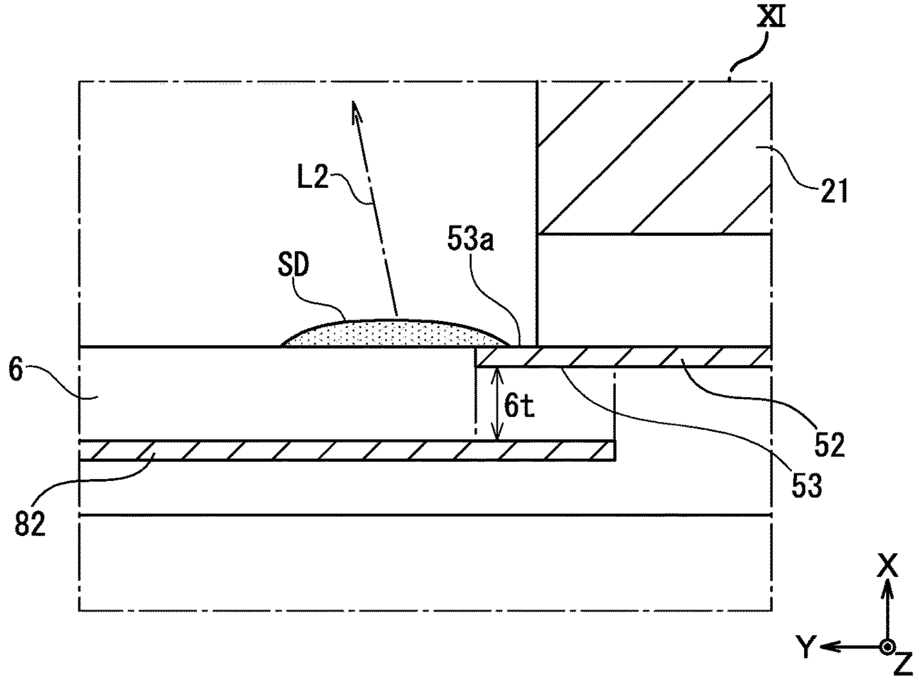
FIG. 11 is an enlarged view of an XI region in FIG. 10.

FIG. 10 is a cross-sectional view schematically showing an ultraviolet ray generation device 1 according to the second embodiment. FIG. 11 is an enlarged view of an XI region in FIG. 10.

The ultraviolet ray generation device 1 includes an excimer lamp 10 having a discharge container 11 in which a discharge gas 10G is sealed, and a first electrode body 21 and a second electrode body 22 that are disposed so as not to be exposed to the discharge gas 10G. The first electrode body 21 and the second electrode body 22 are disposed so as to be separated from each other on an outer surface of the discharge container 11.

The ultraviolet ray generation device 1 also includes a first conductor 5 electrically connected to the first electrode body 21 and a second conductor 8 electrically connected to the second electrode body 22. The first conductor 5 is at an electric potential shared with the first electrode body 21, and the second conductor 8 is at an electric potential shared with the second electrode body 22.

The first conductor 5 includes a first connection 51 connected to the first electrode body 21 and a first conductive layer 52 extending from the first connection 51 in a direction toward the second electrode body 22 and has a substantially L-shaped cross section. The first connection 51 extends from the first electrode body 21 in the −X direction. The first conductive layer 52 extends in the +Y direction from an end in the −X direction of the first connection 51. The first conductive layer 52 extends so as to protrude from an end face 21*a* on the +Y side of the first electrode body 21.

The second conductor 8 includes a second connection 81 connected to the second electrode body 22 and a second conductive layer 82 extending from the second connection 81 in a direction toward the first electrode body 21 and has a substantially L-shaped cross section. The second connection 81 extends from the second electrode body 22 in the −X direction. The second connection 81 is longer in the X direction than the first connection 51. The second conductive layer 82 is shifted to the −X side from the first conductive layer 52. The second conductive layer 82 extends in the −Y direction from an end in the −X direction of the second connection 81. The second conductive layer 82 extends so as to protrude from an end face 22*a* on the −Y side of the second electrode body 22. A distance 82*d* by which the second conductive layer 82 extends from the end face 22*a* is longer than a distance 52*d* by which the first conductive layer 52 extends from the end face 21*a*.

The first conductive layer 52 and the second conductive layer 82 partly overlap each other in the X direction. A portion of the first conductive layer 52 facing the second conductive layer 82 in the X direction is a conductive portion 53 (or a starting point). In other words, the first conductor 5 includes the conductive portion 53 disposed so as to face the second conductor 8. The conductive portion 53 is disposed nearer to the first electrode body 21 out of the first electrode body 21 and the second electrode body 22.

The first conductor 5 and the second conductor 8 are made of a material that has conductivity. Preferably, the first conductor 5 and the second conductor 8 are made of at least one conductive material selected from aurum, platinum, tungsten, titanium, aluminum, and stainless steel or an alloy of any of these conductive materials. More preferably, the first conductor 5 and the second conductor 8 are made of at least one conductive material selected from aurum, platinum, and tungsten or an alloy of any of these conductive materials.

A dielectric member 6 is interposed between the conductive portion 53 and the second conductive layer 82. In the present embodiment, the first conductor 5 and the second conductor 8 are substantially fully mounted into the dielectric member 6, with the first conductor 5 and the second conductor 8 being separated from each other. The first conductor 5 and the second conductor 8 that are substantially fully mounted into the dielectric member 6, described herein, mean that at least a part of the conductive portion 53 of the first conductor 5 is exposed to the atmosphere. In the present embodiment, a part of a surface on the +X side of the conductive portion 53 (referred to as an exposed area 53*a*) is exposed to the atmosphere. The exposed area 53*a* is disposed between the first electrode body 21 and the second electrode body 22. Preferably, the exposed area 53*a* is disposed so as to face the excimer lamp 10. The exposed area 53*a* is not necessarily fully exposed to the atmosphere. From the viewpoint of corrosion prevention, a thin coating of about 10 to 20 μm, for example, may be applied.

A thickness 6*t* of the dielectric member 6 interposed between the conductive portion 53 and the second conductor 8 (see FIG. 11) is smaller than a total thickness (twice a thickness lit) that is a sum of the thickness lit of the discharge container 11 interposed between the first electrode body 21 and the discharge gas 10G (see FIG. 10) and the thickness lit of the discharge container 11 interposed between the second electrode body 22 and the discharge gas 10G (a shortest distance) (see FIG. 10). This facilitates the occurrence of an atmospheric discharge around the conductive portion 53.

Preferably, the dielectric member 6 is made of a material that displays high insulation performance, high mechanical strength, and high transmittance to ultraviolet rays. In one example, the dielectric member 6 is made of a ceramic material such as quartz glass and alumina or a resin such as PTFE.

In the ultraviolet ray generation device 1 according to this embodiment, a voltage is applied between the electrode bodies 21, 22 and concurrently a voltage is applied between the first conductor 5 connected to the first electrode body 21 and the second conductor 8 connected to the second electrode body 22. At this time, a distance between the conductive portion 53 of the first conductor 5 and the second conductor 8 is shorter than a distance between the first electrode body 21 and the second electrode body 22. Thus, insulation breakdown occurs first at a low voltage between the conductive portion 53 and the second conductor 8. This causes a creeping discharge SD along a surface of the dielectric member 6 with the exposed area 53*a* of the conductive portion 53 as a starting point. The creeping discharge SD causes an ultraviolet ray L2 to be emitted. A band of wavelengths that the ultraviolet ray L2 has includes 226 to 227 nm. This helps to efficiently assist a light emission operation in a band of wavelengths shorter than 240 nm with a starting discharge.

The ultraviolet ray L2 due to the creeping discharge SD induces excimers to be excited in the discharge space of the excimer lamp 10 (a discharge occurs). Thus, when the ultraviolet ray L2 from the first conductor 5 enters the excimer lamp 10 in a state where a voltage is applied to the discharge gas 10G through the electrode bodies 21, 22, the excimer lamp 10 becomes lit in a short time (e.g., within 0 seconds to 2 seconds) by this optical energy as a trigger. When the discharge gas 10G contains krypton (Kr) and chlorine (Cl), light emitted from the excimer lamps 10 is ultraviolet rays having a peak wavelength of 222 nm.

As described above, the ultraviolet ray generation device 1 according to the second embodiment includes the excimer lamp 10 having the discharge container 11 in which the discharge gas 10G is sealed, the first electrode body 21 and the second electrode body 22 that are disposed so as not to be exposed to the discharge gas 10G, and the first conductor 5 electrically connected to the first electrode body 21. The first conductor 5 and the second conductor 8 face each other through the dielectric member 6, and the first conductor 5 causes an atmospheric discharge (a creeping discharge) around a distal end (the conductive portion 53) of the first conductor 5, which is a starting point of the discharge.

Other Embodiments

Figure 12:
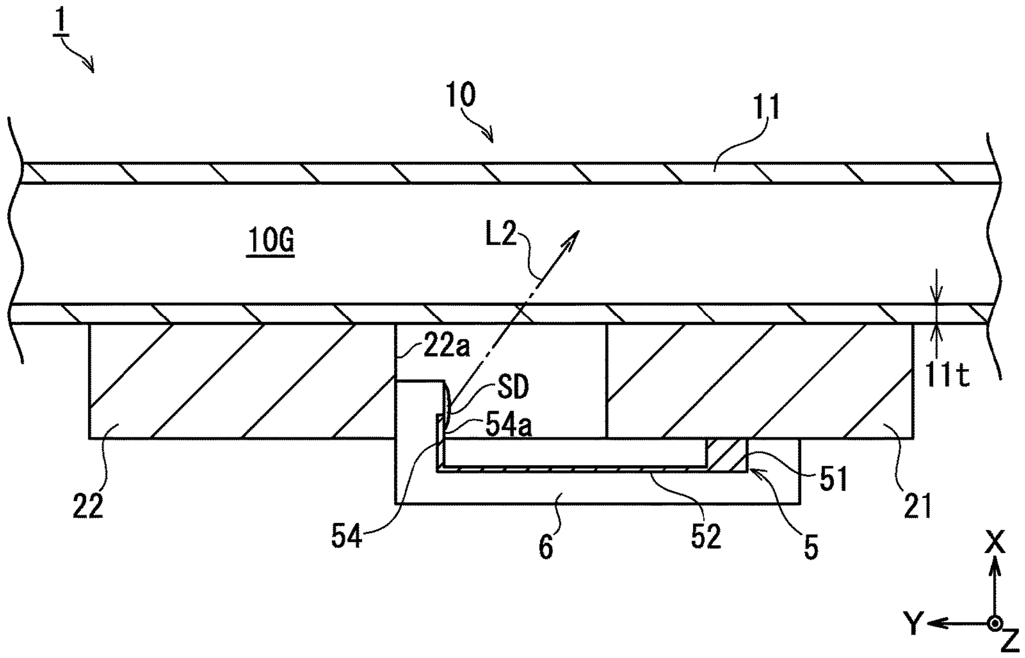
FIG. 12 is a cross-sectional view schematically showing an ultraviolet ray generation device according to another embodiment.

FIG. 12 is a cross-sectional view schematically showing the ultraviolet ray generation device 1 according to another embodiment. In this example, the first conductor 5 includes a conductive portion 54 that is disposed so as to face the second electrode body 22 through the dielectric member 6. In other words, the ultraviolet ray generation device 1 does not include a second conductor 8.

The conductive portion 54 extends in the +X direction from an end in the +Y direction of the first conductive layer 52. The conductive portion 54 extends so as to be planar and face the end face 22*a* on the −Y side of the second electrode body 22. A part of a surface on the −Y side of the conductive portion 54 (referred to as an exposed area 54*a*) is exposed to the atmosphere. This, in the same way as the second embodiment above, causes a creeping discharge SD along a surface of the dielectric member 6 with the exposed area 54*a* of the conductive portion 54 as a starting point. The creeping discharge SD causes an ultraviolet ray L2 to be emitted.

Third Embodiment

A third embodiment is similar in configuration to the first embodiment except for components described below. Therefore, descriptions of the common points will be omitted and differences will be primarily described. In the third embodiment, elements having structures or functions (effects) substantially similar to those described in the first embodiment are represented, and descriptions thereof will not be repeated.

Figure 13:
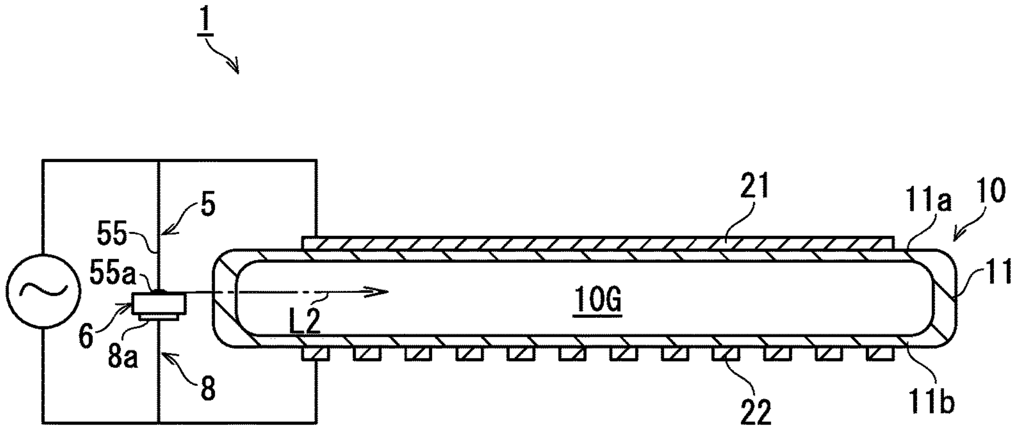
FIG. 13 is a cross-sectional view schematically showing an ultraviolet ray generation device according to a third embodiment.

FIG. 13 is a cross-sectional view schematically showing an ultraviolet ray generation device 1 according to the third embodiment.

The ultraviolet ray generation device 1 includes an excimer lamp 10 having a discharge container 11 in which a discharge gas 10G is sealed, and a first electrode body 21 and a second electrode body 22 that are disposed so as not to be exposed to the discharge gas 10G.

The discharge container 11 is long in a direction perpendicular to the drawing plane of FIG. 13. The discharge container 11 has a cross section that is compressed and substantially quadrilateral and has a pair of flat walls 11*a*, 11*b*.

The first electrode body 21 and the second electrode body 22 are disposed on outer surfaces of the pair of the flat walls 11*a*, 11*b*, respectively, of the discharge container 11. The first electrode body 21 is connected to, for example, the high-voltage side of a power source, and the second electrode body 22 is connected to, for example, the low-voltage side of the power source. At least one of the first electrode body 21 and the second electrode body 22 is made of such a material or has such a shape that transmission of ultraviolet rays is allowed or an area impervious to light is small. In this embodiment, the second electrode body 22 is made of a metal that has, for example, a mesh shape or a coil shape. On the other hand, the first electrode body 21 is a solid electrode. The first electrode body 21 and the second electrode body 22 may have such a shape that light is allowed to pass through and may be, for example, electrodes that have slits.

The ultraviolet ray generation device 1 includes a first conductor 5 electrically connected to the first electrode body 21 and a second conductor 8 electrically connected to the second electrode body 22. The first conductor 5 includes a conductive portion 55 that is disposed so as to face the second conductor 8 through a dielectric member 6. The conductive portion 55 extends in a rod shape toward the second conductor 8.

The second conductor 8 includes a planar portion 8*a* facing a distal end 55*a* of the conductive portion 55. The dielectric member 6 is in the shape of a flat plate and has an area covering a whole of the planar portion 8*a*. The dielectric member 6 is put between the distal end 55*a* of the first conductor 5 and the planar portion 8*a* of the second conductor 8.

When a voltage is applied between the first electrode body 21 and the second electrode body 22, a voltage is also applied between the first conductor 5 connected to the first electrode body 21 and the second conductor 8 connected to the second electrode body 22. At this time, a distance between the distal end 55*a* of the conductive portion 55 and the planar portion 8*a* of the second conductor 8 is shorter than a distance between the first electrode body 21 and the second electrode body 22. Thus, insulation breakdown occurs first at a low voltage in a space between the distal end 55*a* and the planar portion 8*a*, and the first conductor 5 causes a corona discharge at the distal end 55*a* as a starting point. As a result, an ultraviolet ray L2 is emitted from the distal end 55*a* of the first conductor 5.

Fourth Embodiment

A fourth embodiment is similar in configuration to the third embodiment except for components described below. Therefore, descriptions of the common points will be omitted and differences will be primarily described. In the fourth embodiment, elements having structures or functions (effects) substantially similar to those described in the third embodiment are represented, and descriptions thereof will not be repeated.

Figure 14:
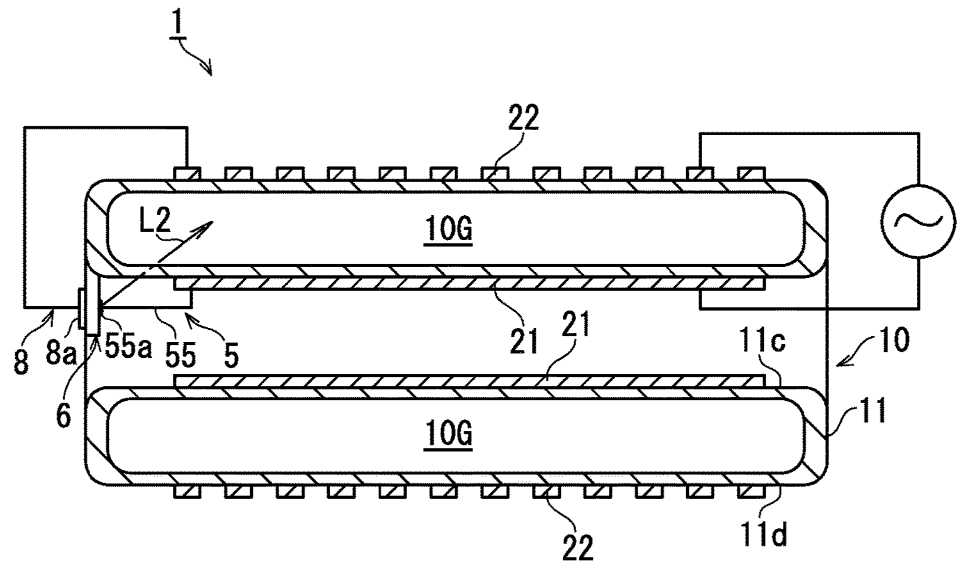
FIG. 14 is a cross-sectional view schematically showing an ultraviolet ray generation device according to a fourth embodiment.

FIG. 14 is a cross-sectional view schematically showing an ultraviolet ray generation device 1 according to the fourth embodiment.

The ultraviolet ray generation device 1 includes an excimer lamp 10 having a discharge container 11 in which a discharge gas 10G is sealed, and a first electrode body 21 and a second electrode body 22 that are disposed so as not to be exposed to the discharge gas 10G.

The discharge container 11 has a double-tube structure that includes tube axes extending parallel to the drawing plane of FIG. 14. The discharge container 11 includes an inner tube 11*c* and an outer tube 11*d* disposed so as to surround the inner tube 11*c*. A space put between the inner tube 11*c* and the outer tube 11*d* is filled with a discharge gas 10G.

The first electrode body 21 is disposed on an inner peripheral wall of the inner tube 11*c*. The second electrode body 22 is disposed on an outer peripheral wall of the outer tube 11*d*. The first electrode body 21 is connected to, for example, the high-voltage side of a power source, and the second electrode body 22 is connected to, for example, the low-voltage side of the power source. At least the second electrode body 22 out of the first electrode body 21 and the second electrode body 22 is made of such a material or has such a shape that transmission of ultraviolet rays is allowed or an area impervious to light is small. In this embodiment, the second electrode body 22 is made of a metal that has, for example, a mesh shape or a coil shape.

Fifth Embodiment

Figure 16:
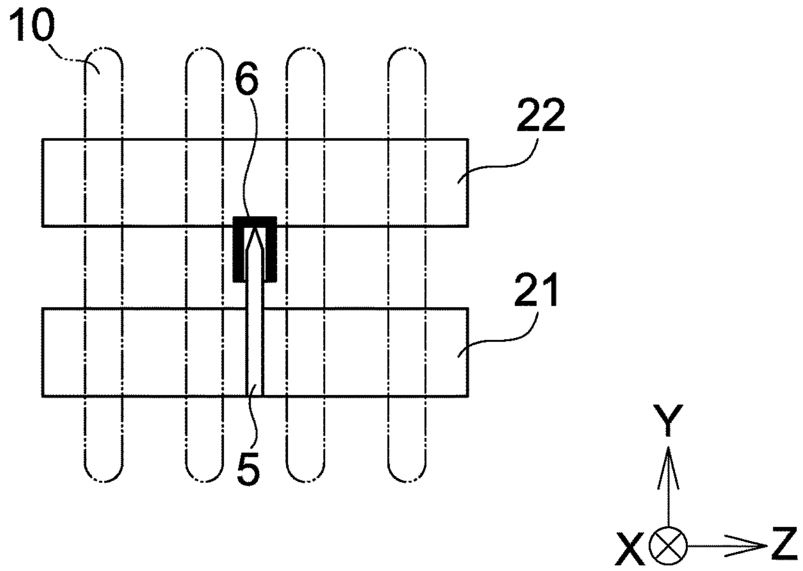
FIG. 16 is a plan view schematically showing electrode bodies according to a fifth embodiment.

FIG. 16 is a plan view schematically showing electrode bodies (21, 22) according to a fifth embodiment.

In this example, a first conductor 5 is in the shape of a rod having a sharp-pointed distal end part (starting point). A dielectric member 6 has a bottomed tubular shape. However, in this example, unlike the example shown in FIG. 7, the dielectric member 6 is held only by the second electrode body 22.

Sixth Embodiment

Figure 17A:
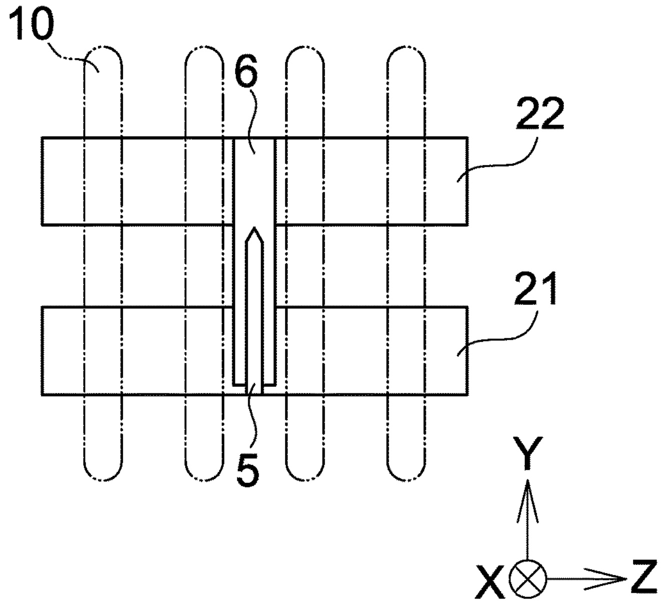
FIG. 17A is a plan view schematically showing electrode bodies according to a sixth embodiment.
Figure 17B:
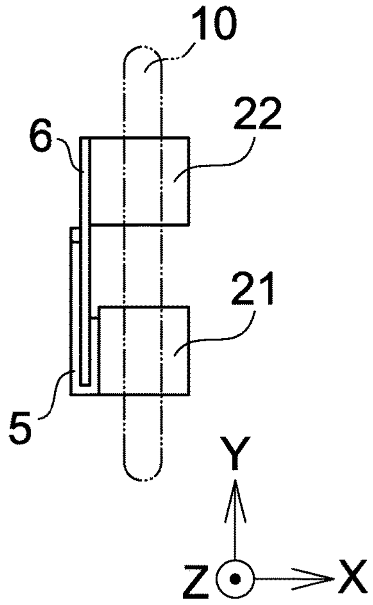
FIG. 17B is a side view schematically showing electrode bodies according to a sixth embodiment.

FIG. 17A is a plan view schematically showing electrode bodies (21, 22) according to a sixth embodiment. FIG. 17B is a side view schematically showing electrode bodies (21, 22) according to a sixth embodiment. In this example, a first conductor 5 has a U shape in the side view and is partly in contact with the first electrode body 21. A dielectric member 6 has a plate shape extending in the Y direction and is put inside the U-shaped first conductor 5. The dielectric member 6 is held by being put between the first conductor 5 and either the first electrode body 21 or the second electrode body 22 on both sides.

Seventh Embodiment

Figure 18A:
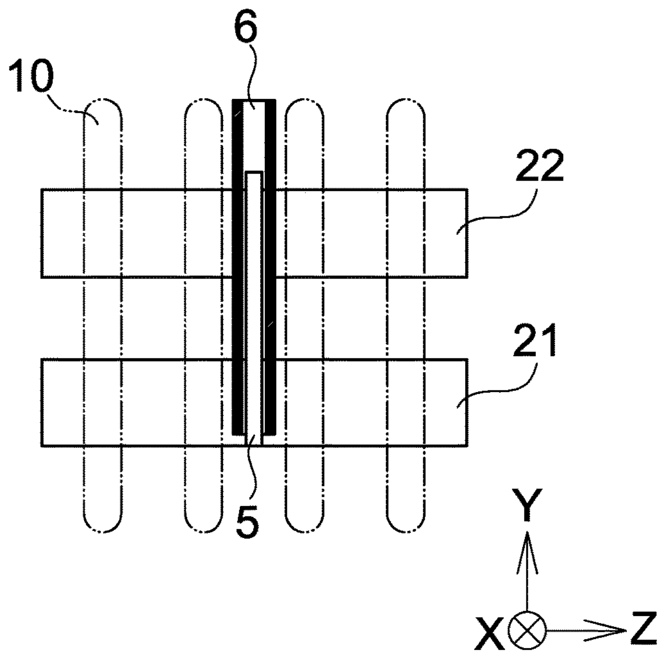
FIG. 18A is a plan view schematically showing electrode bodies according to a seventh embodiment.
Figure 18B:
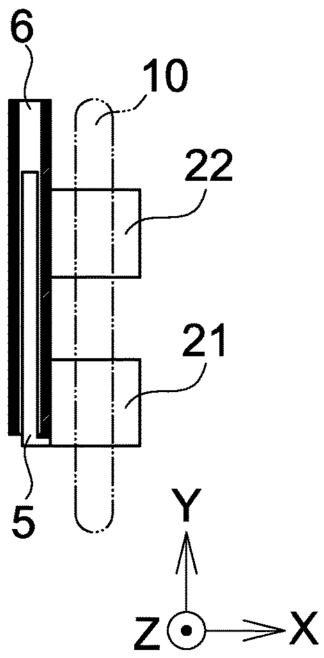
FIG. 18B is a side view schematically showing electrode bodies according to a seventh embodiment.

FIG. 18A is a plan view schematically showing electrode bodies (21, 22) according to a seventh embodiment. FIG. 18B is a side view schematically showing electrode bodies (21, 22) according to a seventh embodiment. In this example, a dielectric member 6 has a tubular shape with opened both ends, and a first conductor 5 is inserted into the dielectric member 6. In this way, the dielectric member may have a tubular shape with opened both ends, whereas the dielectric member may have a tubular shape with closed one end as shown in FIG. 7.

Eighth Embodiment

Figure 19A:
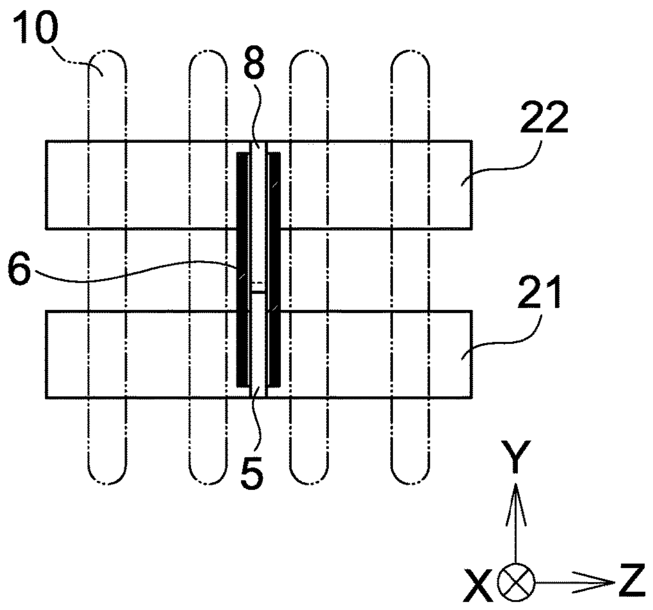
FIG. 19A is a plan view schematically showing electrode bodies according to an eighth embodiment.
Figure 19B:
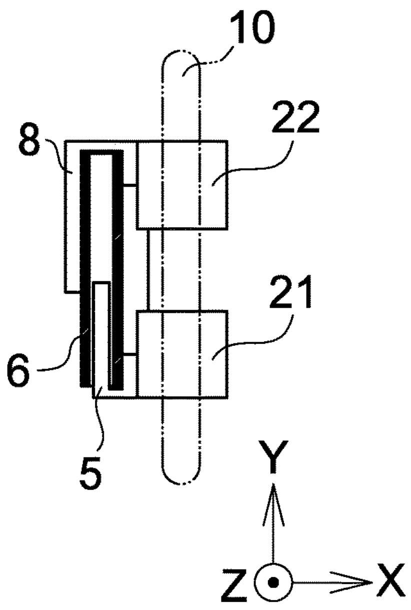
FIG. 19B is a side view schematically showing electrode bodies according to an eighth embodiment.

FIG. 19A is a plan view schematically showing electrode bodies (21, 22) according to an eighth embodiment. FIG. 19B is a side view schematically showing electrode bodies (21, 22) according to an eighth embodiment. In this example, a first conductor 5 and a second conductor 8 are disposed as two start assist electrodes. In other words, the first conductor 5 being connected to the first electrode body 21 and extending toward the second electrode body 22 and the second conductor 8 being connected to the second electrode body 22 and extending toward the first electrode body 21 are disposed. A dielectric member 6 is interposed between the first conductor 5 and the second electrode body 22 and between the first conductor 5 and the second conductor 8. In this example, at least a part of the first conductor 5 is housed in the dielectric member 6 that is tubular. It is desirable that a distal end part (starting point) of a conductive portion of at least one of the first conductor 5 and the second conductor 8 is disposed between the first electrode body 21 and the second electrode body 22. A plurality of the dielectric members 6 may be used such that the dielectric members 6 are interposed between the first conductor 5 and the second electrode body 22 and between the first conductor 5 and the second conductor 8, respectively.

Ninth Embodiment

Figure 20:
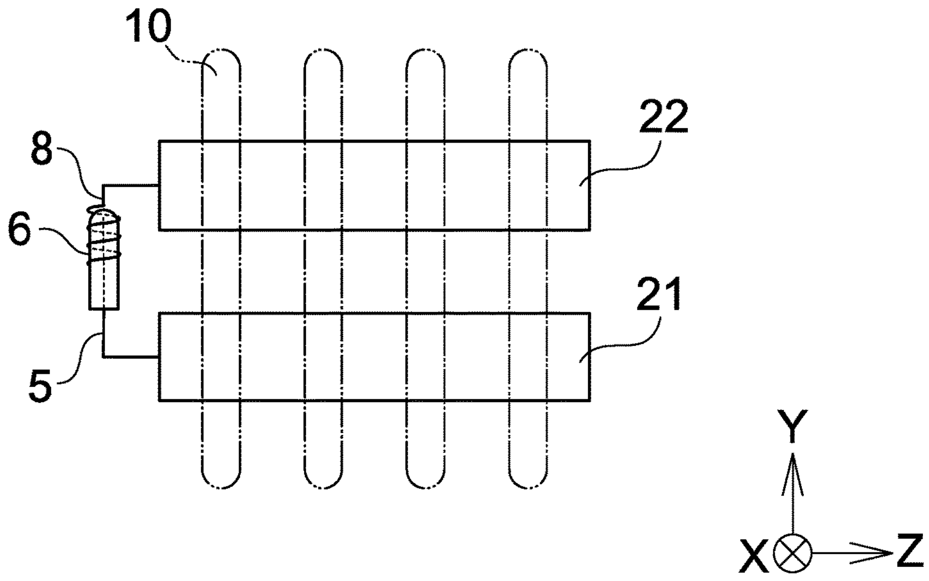
FIG. 20 is a plan view schematically showing electrode bodies according to the sixth embodiment.

FIG. 20 is a plan view schematically showing electrode bodies (21, 22) according to a ninth embodiment. In this example, a dielectric member 6 has a bottomed tubular shape. A first conductor 5 is connected to the first electrode body 21 and extends toward the second electrode body 22.

A distal end part (starting point) of the first conductor 5 is pressed against a bottom part of the dielectric member 6. A second conductor 8 connected to the second electrode body 22 is wound in a coil shape around a bottom side of the dielectric member 6.

Other configurations described below may be adopted.

Figure 21:
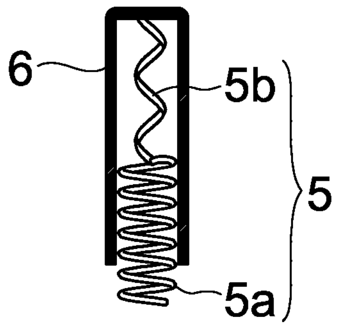
FIG. 21 is a schematic view showing a first conductor and a dielectric member according to another embodiment.

(1) FIG. 21 is a schematic view showing the first conductor 5 and the dielectric member 6 according to another embodiment. In this example, the first conductor 5 includes a proximal part 5*a* in the shape of a spring and a distal part 5*b* in the shape of a spring. The first conductor 5 is compose of a single coiled spring, and pitch of the distal part 5*b* is wider than pitch of the proximal part 5*a*.

Figure 22:
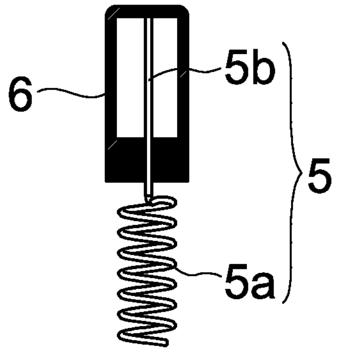
FIG. 22 is a schematic view showing a first conductor and a dielectric member according to another embodiment.

(2) FIG. 22 is a schematic view showing the first conductor 5 and the dielectric member 6 according to another embodiment. In this example, unlike the example shown in FIG. 7, the dielectric member 6 is shaped so as to be airtight with closed both ends. An atmospheric gas or a nitrogen gas, which is a main ingredient in the atmosphere, for example, is sealed inside the dielectric member 6. An inside of the dielectric member 6 may have a negative pressure from the viewpoint of further improvement of startability.

Figure 23:
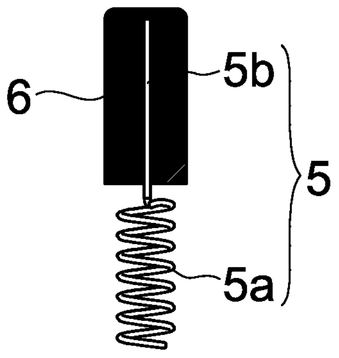
FIG. 23 is a schematic view showing a first conductor and a dielectric member according to another embodiment.

(3) FIG. 23 is a schematic view showing the first conductor 5 and the dielectric member 6 according to another embodiment. In this example, no space exists inside the dielectric member 6, which is in close contact with the distal part 5*b* of the first conductor 5. This can cause an atmospheric discharge on an outside surface of the dielectric member 6 at a place close to a distal end part (starting point) of the first conductor 5.

(4) The first conductor 5 according to the present invention may be a member independent of the electrode bodies (21, 22) or may be integrated with any of the electrode bodies.

(5) It is desirable that a starting point of the first conductor 5 according to the present invention is disposed at a position facing the discharge container 11 of the excimer lamp 10. This allows ultraviolet rays generated at the starting point of the first conductor 5 to readily reach the discharge space inside the excimer lamp 10 without being shielded and excitation of excimers to be readily induced in the discharge space (an electric discharge is ready to occur). In this case, a member that transmits ultraviolet rays may be interposed between the discharge container 11 of the excimer lamp and the starting point. It is more desirable to have a configuration in which any interposition does not exist between the discharge container 11 and the starting point from the viewpoint of introducing ultraviolet rays in a band of short wavelengths to the discharge container 11 without being attenuated.

(6) It is desirable that a starting point of the first conductor 5 according to the present invention is disposed at a position close to the discharge container 11 of the excimer lamp 10. This allows slight ultraviolet rays that are generated at the starting point of the first conductor 5 and that are in a band of short wavelengths to readily reach the discharge space inside the excimer lamp 10 and excitation of excimers to be readily induced in the discharge space (an electric discharge is ready to occur). Specifically, the distance between the discharge container 11 of the excimer lamp 10 and the starting point is less than 30 mm. In addition, the distance is desirably less than or equal to 20 mm and is desirably less than or equal to 15 mm.

EXAMPLES

Hereinafter, examples which specifically show a construction and effect of the present invention will be described below. An ultraviolet ray generation device having the following specifications was prepared and designated as an example. A first conductor 5 and a dielectric member 6 were made to have the configuration shown in FIG. 16.

[Discharge Container]

Material=quartz glass, outer diameter=6 mm, total length=60 mm

[Discharge Gas]

Gas Pressure: 20 kPa, gas type: a mixed gas of Cl and Kr

[Electrode Body]

Material=aluminum

Length=60 mm, inter-electrode distance=6 mm

[Inverter]

Voltage: 5 kV, frequency: 100 kHz

[First Conductor]

Material=aluminum

Width=1.5 mm, thickness=0.1 mm, length=25 mm

[Dielectric Member]

Outer diameter=3 mm, inner diameter=1.6 mm, length=5 mm, thickness=1.4 mm.

Figure 24:
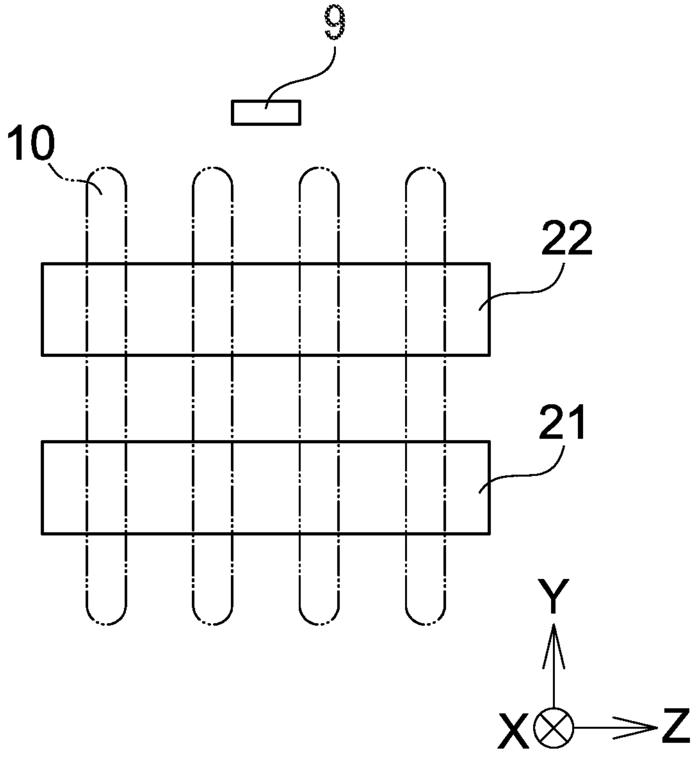
FIG. 24 is a plan view schematically showing electrode bodies according to Comparative Example 2.

The ultraviolet ray generation device that was not provided with a start assist electrode and a dielectric substance was designated as Comparative example 1. The ultraviolet ray generation device that was, as shown in FIG. 24, provided with an LED 9 as a start assist light source rather than being provided with a start assist electrode and a dielectric substance was designated as Comparative example 2. The LED 9 emits ultraviolet rays having a wavelength of 275 nm.

In each of the examples, a voltage was applied between the electrodes under the inverter conditions described above, and the excimer lamp was lit for 8500 hours. Tests were conducted on the excimer lamp to evaluate start ability. In each of the examples, 10 startability tests were conducted, and startability was evaluated using an average value of periods of time (start-up delay time) taken until the excimer lamp was lit following the start of application of the voltage. Table 1 shows results of the example, and Table 2 shows results of Comparative example 2. In Table 1, a case in which the excimer lamp was lit in 1 second or less was recoded as 0 second.

TABLE 1

| Start-up delay time [s] | | | | | | | | | |
|---|---|---|---|---|---|---|---|---|---|
| 1st | 2nd | 3rd | 4th | 5th | 6th | 7th | 8th | 9th | 10th |
| 2 | 2 | 1 | 0 | 1 | 1 | 1 | 1 | 2 | 0 |

Average start-up delay time: 1.1 seconds

TABLE 2

| Start-up delay time[s] | | | | | | | | | |
|---|---|---|---|---|---|---|---|---|---|
| 1st | 2nd | 3rd | 4th | 5th | 6th | 7th | 8th | 9th | 10th |
| 21 | 75 | 123 | 21 | 13 | 113 | 19 | 5 | 18 | 51 |

Average start-up delay time: 45.9 seconds

In the example, as shown in Table 1, the average start-up delay time was 1.1 seconds. In Comparative example 1, the excimer lamp was not lit even in 60 seconds. In Comparative example 2, as shown in Table 2, the average start-up delay time was 45.9 seconds. In other words, the ultraviolet ray generation device according to the present invention provided substantially improved startability.

DESCRIPTION OF REFERENCE SIGNS

1 Ultraviolet ray generation device
5 First conductor
5*a* Proximal part
5*b* Distal part
5*c* Distal end
6 Dielectric member
8 Second conductor
8*a* Planar portion
10 Excimer lamp
10G Discharge gas
11 Discharge container
21 First electrode body
22 Second electrode body
53 Conductive portion
53*a* Exposed area
54 Conductive portion
54*a* Exposed area
55 Conductive portion
55*a* Distal end
L1 Ultraviolet ray
L2 Ultraviolet ray
SD Creeping discharge

The invention claimed is:

1. An ultraviolet ray generation device comprising:

an excimer lamp having a discharge container in which a discharge gas is sealed;

a first electrode body and a second electrode body that are disposed so as not to be exposed to the discharge gas; and a first conductor electrically connected to one of the first electrode body and the second electrode body, wherein the first conductor has a portion facing an other electrode body or a second conductor electrically connected to the other electrode body, through a dielectric member, and the first conductor causes an atmospheric discharge around the first conductor.

2. The ultraviolet ray generation device according to claim 1, wherein the dielectric member is a member distinct from the discharge container.

3. The ultraviolet ray generation device according to claim 1, wherein a thickness of the dielectric member interposed between the first conductor and either the other electrode body or the second conductor is smaller than a sum of a thickness of the discharge container interposed between the first electrode body and the discharge gas and a thickness of the discharge container interposed between the second electrode body and the discharge gas.

4. The ultraviolet ray generation device according to claim 1, wherein the first conductor is made of at least one conductive material selected from aurum, platinum, tungsten, titanium, aluminum, and stainless steel or an alloy of the conductive material.

5. The ultraviolet ray generation device according to claim 4, wherein the first conductor is made of at least one conductive material selected from aurum, platinum, and tungsten or an alloy of the conductive material.

6. The ultraviolet ray generation device according to claim 1, wherein the first conductor extends in a rod shape toward the other electrode body or the second conductor, and the first conductor causes an atmospheric discharge at a distal end of the first conductor as a starting point.

7. The ultraviolet ray generation device according to claim 6, wherein the second conductor comprises a planar portion facing the distal end of the first conductor.

8. The ultraviolet ray generation device according to claim 1, wherein the first conductor extends so as to be planar and face the other electrode body or the second conductor, and the first conductor causes a creeping discharge along a surface of the dielectric member with a distal end of the first conductor as a starting point.

* * * * *